United States Patent [19]

Barker

[11] Patent Number: 5,800,751
[45] Date of Patent: Sep. 1, 1998

[54] METHOD OF MAKING PAINT BRUSH WITH CO-INJECTION MOLDED HANDLE

[75] Inventor: Richard L. Barker, Apple Creek, Ohio

[73] Assignee: The Wooster Brush Company, Wooster, Ohio

[21] Appl. No.: 874,179

[22] Filed: Jun. 13, 1997

Related U.S. Application Data

[62] Division of Ser. No. 516,214, Aug. 17, 1995.

[51] Int. Cl.⁶ .................. B29C 44/04; B29C 44/06
[52] U.S. Cl. .............. 264/46.6; 264/45.1; 264/243; 264/255; 264/328.12
[58] Field of Search ................ 264/45.1, 328.12, 264/255, 46.6, 243

[56] References Cited

U.S. PATENT DOCUMENTS

| | | |
|---|---|---|
| 2,075,570 | 3/1937 | Carpenter . |
| 2,155,004 | 4/1939 | Blossom . |
| 2,202,292 | 5/1940 | Howard . |
| 2,417,750 | 3/1947 | Hall . |
| 2,426,315 | 8/1947 | Marick . |
| 2,508,799 | 5/1950 | Reis . |
| 2,664,582 | 1/1954 | Kammann . |
| 2,701,379 | 2/1955 | Balisteri . |
| 2,799,435 | 7/1957 | Abplanalp ............ 264/328.9 |
| 2,854,684 | 10/1958 | Hardman et al. . |
| 2,871,899 | 2/1959 | Coyle et al. . |
| 2,914,785 | 12/1959 | Ela . |
| 3,172,141 | 3/1965 | Arena . |
| 3,819,779 | 6/1974 | Pharris . |
| 3,825,637 | 7/1974 | Robin ............ 264/328.12 |
| 3,831,218 | 8/1974 | Kaplan . |
| 3,873,656 | 3/1975 | Garner ............ 264/45.1 |
| 3,947,175 | 3/1976 | Melcher ............ 264/45.1 |
| 3,972,528 | 8/1976 | McCracken et al. . |
| 3,972,664 | 8/1976 | Fillmann ............ 264/45.1 |
| 3,996,330 | 12/1976 | Jones et al. . |
| 4,014,966 | 3/1977 | Hanning ............ 264/45.1 |
| 4,035,466 | 7/1977 | Langecker ............ 264/45.1 |
| 4,124,308 | 11/1978 | Sokolow ............ 264/328.12 |
| 4,129,635 | 12/1978 | Yasuike et al. ............ 264/328.12 |
| 4,263,691 | 4/1981 | Parkamseree . |
| 4,452,289 | 6/1984 | Smith . |
| 4,609,516 | 9/1986 | Krishnakumar et al. ............ 264/255 |
| 4,670,199 | 6/1987 | Montet et al. ............ 264/328.12 |
| 4,751,762 | 6/1988 | Meimeteas . |
| 4,781,879 | 11/1988 | Oishi ............ 264/328.12 |
| 4,997,356 | 3/1991 | Katagiri ............ 425/117 |
| 5,011,394 | 4/1991 | Katagiri et al. ............ 425/117 |
| 5,018,958 | 5/1991 | Mizuno et al. ............ 425/117 |
| 5,045,268 | 9/1991 | Sorensen ............ 264/328.7 |
| 5,049,344 | 9/1991 | Sorensen ............ 264/328.7 |
| 5,107,590 | 4/1992 | Burout, III et al. . |
| 5,390,572 | 2/1995 | Gakhar et al. . |
| 5,409,659 | 4/1995 | Matsumoto et al. ............ 264/328.12 |
| 5,500,173 | 3/1996 | Dugan ............ 264/50 |
| 5,683,731 | 11/1997 | Deardurff et al. ............ 264/328.12 |

FOREIGN PATENT DOCUMENTS

| | | |
|---|---|---|
| 2852367 | 6/1980 | Germany . |
| 2274615 | 8/1994 | United Kingdom . |

*Primary Examiner*—Allan R. Kuhns
*Attorney, Agent, or Firm*—Renner, Otto, Boisselle & Sklar, P.L.L.

[57] ABSTRACT

A paint brush handle has an outer layer of a comfortable, relatively soft elastomeric material that surrounds a rigid core of foamed polyolefin. The handle is made using a co-injection process in which a mold cavity is first coated by an initial partial shot of the elastomeric material and then filled by injecting more elastomeric material and polyolefin material containing a foaming agent simultaneously. The simultaneous shot of these materials is achieved by injecting the materials through a single inlet passage into the mold cavity in which the flows are concentric, with the elastomeric material surrounding the polyolefin material. The ferrule is attached to the handle using nails or other suitable fasteners which penetrate into the rigid inner core.

10 Claims, 3 Drawing Sheets

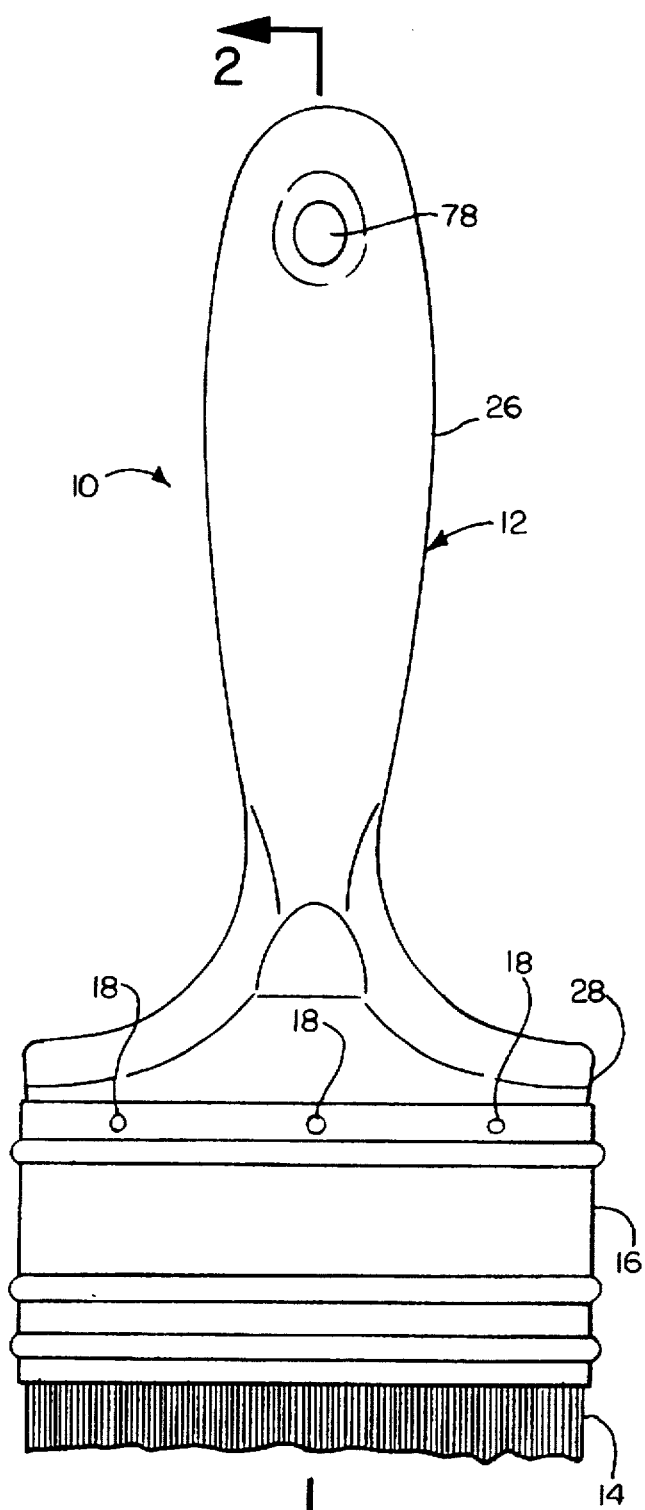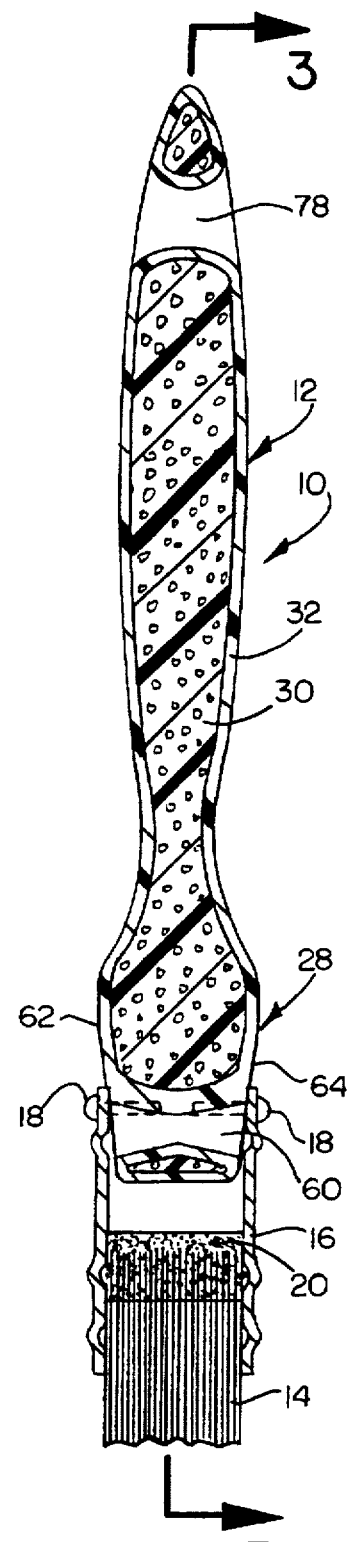

5,800,751

METHOD OF MAKING PAINT BRUSH WITH CO-INJECTION MOLDED HANDLE

This is a divisional of copending application Ser. No. 08/516,214 filed on Aug. 17, 1995.

FIELD OF THE INVENTION

The present invention relates generally to paint brushes and specifically to paint brushes with plastic handles and to the method of making the handle.

BACKGROUND OF THE INVENTION

Paint brushes for household and commercial use have a well established form. A handle, generally of wood or plastic, has a hand grip end and a head end to which a ferrule is secured. The ferrule end is generally in the form of a rectangular solid while the grip end is generally oblong and gently rounded for an easy grip. A ferrule to which the bristles are attached surrounds the head end of the handle, and is nailed or otherwise secured in place.

Paint brush handles should be resistant to the solvents commonly used to clean paint brushes. In addition the handle should be comfortable to grip and be able to retain securely the nails, staples, or other fasteners used to hold the ferrule in place.

SUMMARY OF THE INVENTION

The present invention provides a paint brush handle which has an outer layer of a relatively soft, resilient elastomeric material and an inner core of a relatively rigid foamed polyolefin material. The handle is made by a co-injection process which results in an intimate connection between the materials of the core and outer layer.

Co-injection of the handle is accomplished in a mold with an inlet at the axial outer end of the head portion of the handle. A flow diverter is located just inside the mold cavity and directly opposite the inlet to cause the materials flowing into the cavity to move transversely so as to fill the generally rectangular head portion of the cavity before flowing lengthwise to fill the grip portion of the cavity.

The co-injection process uses an initial partial shot of the softer elastomeric outer material to form at least the skin of the outer layer. After the initial partial shot, both the polyolefin core material and the elastomeric outer material are injected simultaneously, with the core material surrounded by the outer material. The polyolefin core material contains a foaming agent to make the core material foam slightly, thus causing the core and outer materials to fill the mold, with the core material expanding and hardening to a rigid core which is covered by a resilient, cushion-like outer layer. Preferably the core is formed of foamed polypropylene while the outer layer is thermoplastic rubber. The entire outer surface of the relatively rigid foamed polyolefin core is completely coated with the much softer outer elastomeric material for a comfortable grip which is impervious to the usual paint solvents.

BRIEF DESCRIPTION OF THE DRAWINGS

FIG. 1 is a fragmentary elevation view of a preferred form of paint brush constructed in accordance with the present invention;

FIG. 2 is a cross section view of the brush of FIG. 1 looking in the direction of arrows 2—2 of FIG. 1;

DESCRIPTION OF PREFERRED EMBODIMENT

Figure 3:
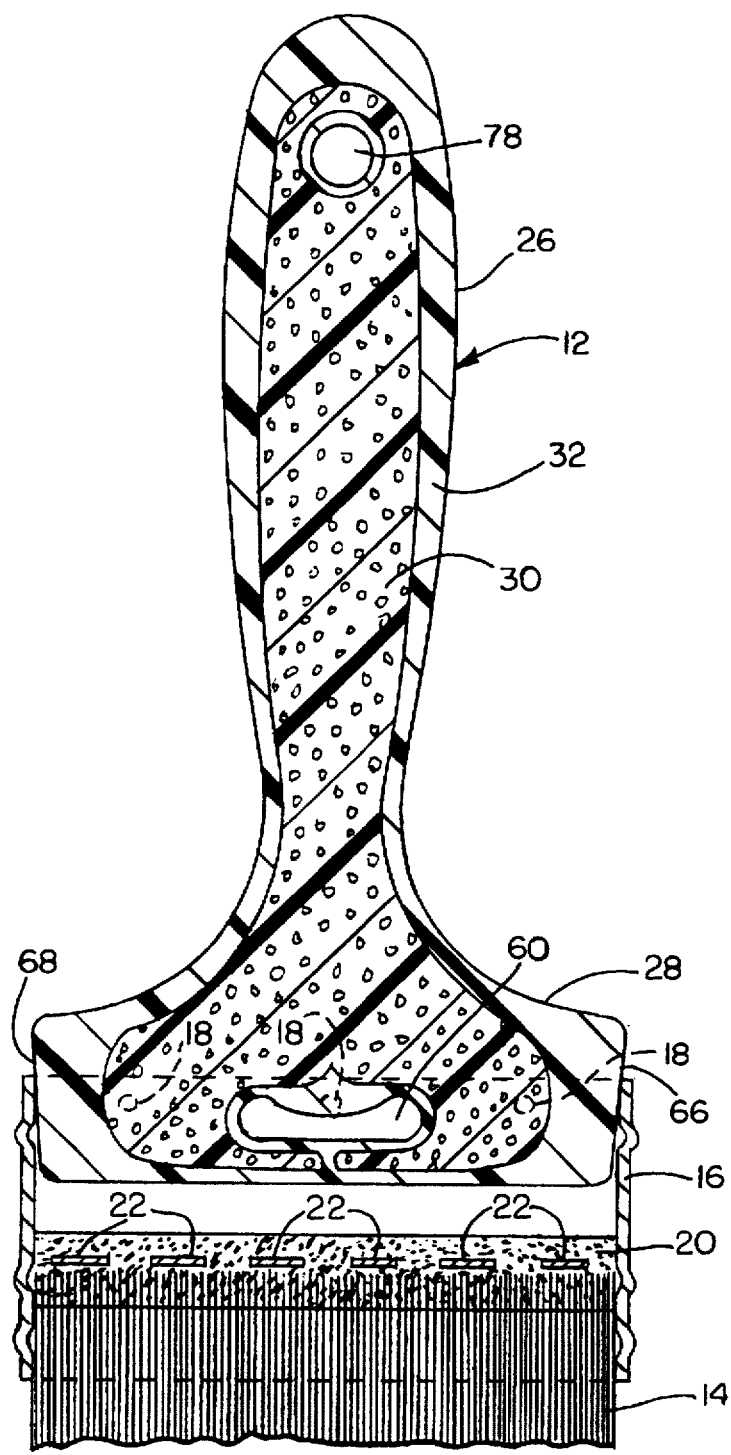
FIG. 3 is a fragmentary cross section view of the brush of FIG. 1, looking in the direction of arrows 3—3 in FIG. 2.

A preferred form of paint brush 10 in accordance with the present invention is illustrated in FIG. 1, and comprises a handle 12, bristles 14 and a ferrule 16 connecting the handle to the bristles. Nails 18 pass through the ferrule 16 and into the handle 12 to hold the ferrule and handle together. As is conventional, the bristles 14 are set in an adhesive 20 (FIG. 3) which may bond around studs 22 which are internal to the ferrule 16, permanently securing the bristles 14 to the ferrule 16.

The handle 12 is generally T shaped, with a grip portion 26 and an enlarged head portion 28, and includes an inner core 30 and an outer layer 32 (FIGS. 2 and 3). The head portion 28 may have the shape of a slightly tapered rectangular solid so that it can be wedged inside the ferrule 16.

The inner core 30 may be made of any suitable crystalline or semi-crystalline polyolefin polymer such as natural and filled polypropylene and high density polyethylene. The polyolefin core material contains a conventional chemical foaming agent to make the core material foam slightly. In one embodiment, the polyolefin material is a polypropylene homopolymer having a melt flow rate of between approximately ten to twelve dg./min., and the foaming agent comprises between approximately 5 to 10% by volume of the polyolefin/foaming agent mixture.

The outer layer 32 is made of a substantially softer elastomeric material such as thermoplastic rubber which gives the handle a cushioned feel, and is resistant to most solvents used in paints. Of course, it should be understood that the present invention may be practiced with other materials that provide a relatively soft, comfortable outer layer and a relatively rigid core, provided the structural features described below are achieved and the materials are compatible with the manufacturing process described.

The inner core 30 and outer layer 32 are proportioned in the region of the head portion 28 so that the nails 18 penetrate the core, rather than just the outer layer. This is necessary in order for the nails 18 to obtain a suitable purchase. Nails 18 which penetrate only the elastomeric outer layer 32 will be less likely to stay securely in place. To this end, in the head portion 28 of the handle 12 the core 30 desirably has a width of between approximately five-eighths and three-fourths of the width of the head portion 28 so that the nails 18 penetrate the core over a substantial portion of the width of the head portion. In one embodiment the width of the core 30 is approximately two-thirds of the width of the head portion.

Of course, other fasteners could be used besides nails, such as screws, staples, rivets or the like. Regardless of the type of fastener chosen, the fasteners securely hold the ferrule 16 in place by penetrating the inner core 30.

Figure 4:
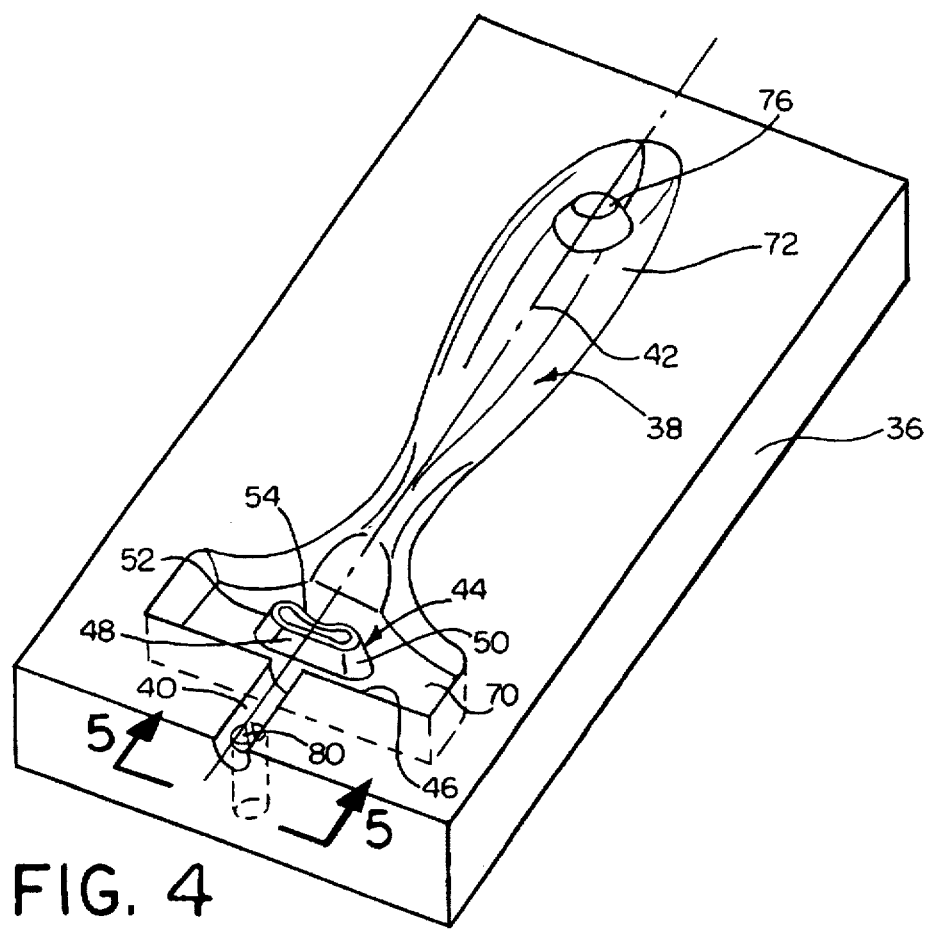
FIG. 4 is a perspective illustration of one half of a mold cavity for producing the brush handle for the brush of FIGS. 1–3.
Figure 5:
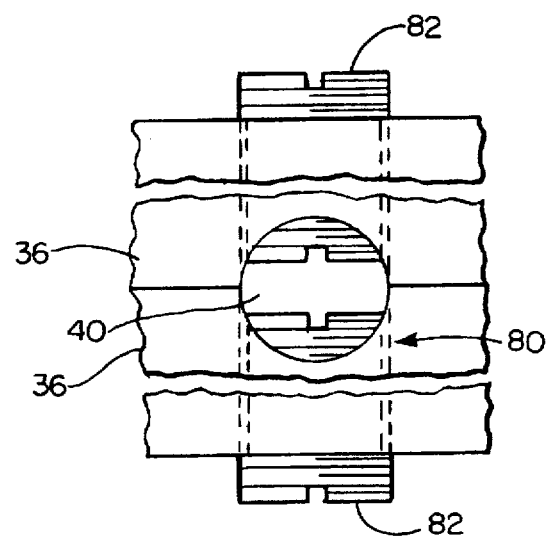
FIG. 5 is an enlarged fragmentary view of a portion of both half molds looking in the direction of arrows 5—5 of FIG. 4.

The handle 12 is made by a co-injection process. FIG. 4 illustrates a mold 36 which is one half of a mold pair used to make the handle 12. The mold 36 has a mold cavity 38 which when paired with another identical mold forms a cavity corresponding in shape to the shape of the brush handle 12. A portion of both half molds which comprise the entire mold 36 is schematically shown in FIG. 5.

The mold 36 includes an inlet passage 40 through which material is injected into the mold cavity 38 that is coaxial with the central axis 42 of the mold cavity 38. A flow diverter 44 is located inside the mold cavity 38 approximately one quarter inch from the adjacent end 46 of the inlet passage 40. In plan view, the flow diverter 44 has a substantially flat front surface 48, rounded ends 50 and 52, and an inwardly curved (concave) back surface 54, so that overall it is generally kidney shape. In vertical cross section the flow diverter 44 generally has the shape of a truncated pyramid so that in cross section two diverters (one in each half mold) provide an hourglass opening 60 through the head portion 28 of the handle as shown in FIG. 2. The opening 60 extends between opposite major side surfaces 62 and 64 of the head portion 28 of handle 12 (FIG. 2) and extends laterally intermediate opposite end surfaces 66 and 68 (FIG. 3) approximately 30% of the distance between them.

The purpose of the flow diverter 44 (FIG. 4) is to cause the molding materials to move laterally upon entering the mold to completely fill the head portion 70 of the mold cavity 38 as well as the grip portion 72 of the cavity 38. Moreover, the concave curved surface 54 of the flow diverter 44 creates a low pressure area which draws the elastomeric material around the diverter, assuring a continuous skin 32 of the elastomeric material around substantially the entire periphery of the handle.

The co-injection process involves initially injecting a partial shot of just the elastomeric material and thereafter injecting both the elastomeric material and a mixture of the polyolefin material and foaming agent at the same time. During the initial partial shot, the elastomeric material that enters the head portion 70 of the cavity 38 is deflected sideways by the diverter 44 and thereafter flows axially to the grip portion 72 of the cavity. This initial material forms a thin coating or skin on the surface of the mold cavity 38 and the diverter 44, as well as on pin 76 which forms opening 78 in the distal end of handle 12. Making the mold 36 of aluminum causes rapid cooling of the elastomeric material so as to form at least the outermost skin of the outer layer 32 with the initial partial shot.

Once the initial partial shot has coated the mold cavity 38, the balance of the material is injected into the mold. This is accomplished by a co-injection process in which more elastomeric material and the polyolefin/foaming agent mixture are simultaneously injected into the mold cavity. The simultaneous shot of these materials is achieved by injecting both materials through the inlet passage 40 into the mold cavity 38 in which the two flows are concentric, with the elastomeric material surrounding the polyolefin/foaming agent mixture. Immediately after the polyolefin/foaming agent mixture is injected into the mold cavity, the foaming agent generates a gas in order to make the polyolefin material foam slightly, thus assuring proper heft to the handle 12 and that the foamed polyolefin material completely fills the volume within the outer layer 12.

The co-injection process is facilitated by a restrictor 80. The restrictor 80 includes two restrictor members 82 which may be adjusted inward or outward relative to each other to regulate the flow through the inlet passage 40 and into the cavity 38. When operated together these two restrictor members 82 control the total flow into the cavity 38 forming an adjustable gate. This is particularly helpful if the mold has more than one cavity 38, since it is important that each cavity receive the same amount of material. Moreover, when the restrictor members 82 are operated independently of each other, they can control the amount of outer layer of elastomeric material injected into the respective half molds 36. In other words, by screwing restrictor members 82 inward or outward, the thickness of the outer layer 32 of elastomeric material in the cavity 38 of each half mold 36 can be controlled, i.e., decreased or increased as desired.

The co-injection process requires time for the materials to cool and harden before demolding. Typically the entire molding cycle lasts about seven minutes from injection through demolding. In order to make efficient use of the injection equipment, it is preferred to provide molds with a plurality of cavities each (for example four cavities) and to mount them in a series of such molds (for example ten molds). In this way while one mold is being filled and another mold is being demolded, the remaining molds are being cooled.

From the foregoing, it is clear that the present invention provides a paint brush 10 (FIGS. 2 and 3) with a handle 12 which has a relatively rigid inner core 32 completely coated with an outer layer 32 of a soft, resilient elastomeric material for a comfortable grip which is impervious to the usual paint solvents. The handle 12 is made by a co-injection process which uses an initial partial shot of the softer outer elastomeric material to form at least the skin of the outer layer 32. After the initial partial shot, both the core and outer materials are injected simultaneously, with the core material surrounded by the outer material. The two materials fill the mold, with the core material expanding and hardening to a relatively rigid core which is covered by a resilient, cushion-like outer layer.

Although the invention has been shown and described with respect to a certain preferred embodiment, it is obvious that equivalent alterations and modifications will occur to others skilled in the art upon reading and understanding the specification. The present invention includes all such equivalent alterations and modifications, and is limited only by the scope of the claims.

What is claimed is:

1. A method of making a paint brush handle in a mold having a cavity defining the shape of the paint brush handle with an axially extending grip portion and a head portion, the cavity having an inlet for molding material coaxially with the axis of the handle, comprising the steps of positioning a flow diverter in the head portion of the cavity opposite the inlet, directing through the inlet and toward the diverter an initial partial shot of an elastomeric material to form a coating on the inside of the mold cavity, and thereafter simultaneously injecting more elastomeric material and a polyolefin material containing a foaming agent surrounded by the elastomeric material to fill the balance of the mold cavity.

2. The method of claim 1 wherein the elastomeric material comprises thermoplastic rubber.

3. The method of claim 2 wherein the polyolefin material comprises polypropylene which is subsequently simultaneously injected into the mold cavity along with more of the thermoplastic rubber which surrounds the polypropylene.

4. The method of claim 3 wherein the polypropylene has a melt flow rate of between approximately ten and twelve dg./min.

5. The method of claim 1 further comprising the step of controlling the flow of the materials through the inlet.

6. The method of claim 5 wherein two restrictor members extend into opposite sides of the inlet to provide for independent adjustment to control different portions of the flow of the materials through the inlet.

7. The method of claim 1 wherein the mold is made of aluminum to cause rapid cooling of the coating of the elastomeric material on the inside of the mold.

8. The method of claim 1 wherein the foaming agent comprises between approximately five and ten percent by volume of the total volume of polyolefin material and foaming agent.

9. The method of claim 8 wherein the head portion is defined by opposite major side surfaces and opposite end surfaces which form a generally rectangular solid, the flow diverter forming an opening through the head portion between the major side surfaces.

10. The method of claim 9 wherein the opening through the head portion defines a plane generally normal to the axis of the grip portion and having an extent in the direction of the two end surfaces of approximately 30% of the distance between the end surfaces.

* * * * *